(12) United States Patent
Mellot et al.

(10) Patent No.: US 8,471,816 B2
(45) Date of Patent: Jun. 25, 2013

(54) VARIABLE GAIN MOUSE

(75) Inventors: Pascal Mellot, Lans en Vercors (FR); Arnaud Glais, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 1233 days.

(21) Appl. No.: 11/752,830

(22) Filed: May 23, 2007

(65) Prior Publication Data

US 2008/0007519 A1     Jan. 10, 2008

(30) Foreign Application Priority Data

May 24, 2006   (FR) ...................................... 06 04691

(51) Int. Cl.
*G09G 5/00* (2006.01)
(52) U.S. Cl.
USPC ........................................................ 345/163
(58) Field of Classification Search
USPC ......................................... 345/166–168, 163
See application file for complete search history.

(56) References Cited

U.S. PATENT DOCUMENTS

| | | | | |
|---|---|---|---|---|
| 5,184,319 | A * | 2/1993 | Kramer | 703/5 |
| 5,191,641 | A | 3/1993 | Yamamoto et al. | |
| 7,173,637 | B1 * | 2/2007 | Hinckley et al. | 345/684 |
| 2003/0048255 | A1 * | 3/2003 | Choi et al. | 345/166 |
| 2004/0066371 | A1 * | 4/2004 | Huang | 345/163 |
| 2005/0001817 | A1 * | 1/2005 | Lauffenburger et al. | 345/166 |
| 2006/0028449 | A1 * | 2/2006 | Ranta | 345/163 |
| 2006/0132447 | A1 * | 6/2006 | Conrad | 345/168 |
| 2007/0247428 | A1 * | 10/2007 | Hock et al. | 345/166 |

FOREIGN PATENT DOCUMENTS

| | | | |
|---|---|---|---|
| EP | 0742510 | A2 | 11/1996 |
| EP | 1095821 | A2 | 5/2001 |
| EP | 1182606 | A2 | 2/2002 |
| EP | 1291810 | A2 | 3/2003 |
| EP | 1574994 | A1 | 9/2005 |

* cited by examiner

*Primary Examiner* — Quan-Zhen Wang
*Assistant Examiner* — Tony Davis
(74) *Attorney, Agent, or Firm* — Seed IP Law Group PLLC

(57) ABSTRACT

A motion capture device for communicating with a host device in order to input captured motion. The device includes an amplifier module structured to weight displacement measurements by a gain, and an adjustment module structured to adjust the gain as a function of a speed of the capture device.

18 Claims, 4 Drawing Sheets

VARIABLE GAIN MOUSE

BACKGROUND

1. Technical Field

The present invention relates to motion capture devices cooperating with a host device in order to record captured motion, particularly, but not limited to, mice intended to communicate with a computer.

2. Description of the Related Art

FIG. 1 shows an example of a known motion capture and display system. A device 1, for example an optical mouse, comprises measuring means 2, 3 comprising for example a lens and a sensor represented by 2. The sensor captures images, which it sends to displacement determination means 3. These means 3 compare the images received to determine a displacement between successive images.

Such displacement is commonly measured in two dimensions. In the present description, the terms "displacement", "points", "counts", "displacement measurement", "number of pixels", etc. are commonly understood to mean pairs of values, for example (X, Y). Of course, the concepts of "displacement", "points", etc. may also correspond to triplets of values for measurements in three dimensions, or single values for measurements in one dimension.

Each displacement is counted in "counts", with each count corresponding to a 32nd of a point.

For example, if the sensor associates a point with a distance of 30 μm, and the lens has a gain of 2, then the determination means 3 associate a point with an actual displacement of 60 μm.

A displacement of 25.4 mm (one inch) in a given direction therefore corresponds to the integer value of $$\frac{25.4}{2*30*10^{-3}}*32,$$

which is 13546 counts.

Weighting means 9 weight the number of counts by a gain motion_scaling. A shift in the corresponding register divides the result by 256. Thus for a motion_scaling of 8, a CPI (counts per inch) parameter equals the integer of $$13546*\frac{8}{256},$$

that is 423 counts per inch.

The means 3, 9, may be integrated into the same means for processing, for example a processor 10.

For each displacement, and for each direction x,y, the weighted counts are sent to an accumulator 4 which adds the number of counts sent to an accumulated number of counts.

The values X, Y stored in the accumulator 4 are regularly read, truncated, then sent to a buffer of a processor 5 of a host device, for example a central processing unit 8, using for example a USB bus. In the case of a wireless mouse, a wireless communication protocol may be provided for transmitting each number of accumulated counts to the processor of the central processing unit.

After each read, the truncated, meaning rounded, value is deducted from the value stored in the accumulator 4. In this manner the accumulator 4 continues to receive the values of the weighted number of counts between two reads.

A driver program run by the processor 5 may be used to amplify by a given factor each value for the number of accumulated counts received. The driver also allows displacing a pointer 6 on a screen 7 by a number of pixels approximately proportional to each amplified value and in the corresponding direction. The motions of the pointer 6 on the screen are thus approximately proportional to the motion captured by the capturing means 2.

For a factor equal to 1, each count transmitted is represented by an apparent displacement of one pixel on the screen. The factor may be greater than or less than 1.

With the improved resolution of monitors, the number of pixels per screen is tending to increase. In order to avoid a decrease in the apparent displacement of the pointer on the screen for a given mouse displacement, the number of pixels for a given actual displacement is also tending to increase.

To increase the number of pixels corresponding to a given displacement, one may increase the factor applied by the driver in the host device and/or the CPI parameter applied in the mouse 1.

Currently there is no existing standard which imposes the value of the total gain (or CPI parameter) applied by the mouse. The motion_scaling gain may even be programmable, such that the value of the CPI parameter may be chosen relatively freely by the mouse manufacturer.

In this manner, the usual value of the CPI parameter for mice has grown from around 400 CPI to around 800 CPI within only a few years. One may imagine mice with a CPI parameter of around 1600 or even 3200 CPI for high resolution monitors or certain video games.

However, the value of the accumulated number of counts stored in the accumulator may then grow relatively quickly.

The channel used to transmit the value stored in the accumulator to the host device has limited bandwidth. Reading the value stored in the accumulator is therefore done at a predetermined maximum report rate.

For example, for a USB port, the HID (Human Interface Device) specification authorizes reading 8 bytes every 8 milliseconds. Of these 8 bytes, four are dedicated to the transmission of information about the mouse button clicks (not represented). The four remaining bytes are dedicated to the transmission of the values stored in the accumulator. Therefore for each direction x, y, two 8-bit bytes may be transmitted every 8 milliseconds.

A PS2 port is limited to 4 bytes every 8 milliseconds.

If transmitting using 27 MHz wireless technology, the bandwidth may be close to that of the HID specification, including the encoding which must occur for error protection.

For example, for a wireless mouse capable of transmitting 8 signed bits of data every 10 milliseconds for each direction x, y, 127 counts (positive or negative) may be transmitted every 10 milliseconds, which is 12700 counts per second. If the value of the CPI parameter is 400 CPI, this limitation corresponds to a maximum mouse speed in direction x or y of $$\frac{12700}{400}*25.4*10^{-3}$$

meters per second, which is approximately 0.8 m/s. If the value of the CPI parameter is 1600 CPI, the maximum speed in direction x or y falls to approximately 0.2 m/s. If the user moves the mouse more quickly, transmission to the host device encounters overflow problems. This limitation may become an annoyance for certain applications, such as gaming applications.

One solution consists of choosing a relatively low CPI parameter and a relatively high factor to be applied by the driver. This factor may be modified relatively easily via a user interface. In this manner, someone using the mouse is not constrained to move the mouse over relatively high distances in order to display a given pointer displacement on the screen. Also avoided are the problems related to overflow when transmitting the accumulated number of counts from the mouse to the host device.

However, the displacements shown on the screen may be imprecise. The number of counts corresponding to a given displacement is relatively low, such that the displacement is translated into a number of counts in an approximate manner only. In addition, if the factor used by the driver is relatively high, the apparent minimum displacement, corresponding to one count, may be greater than a pixel.

It is also known to provide a variable factor to be applied by the driver. If an acceleration is detected, the factor decreases. However, this solution does not eliminate the loss of precision related to the conversion into the number of counts. When no acceleration is detected, the factor may be relatively high, which increases the loss in precision. In addition, detection of acceleration by the software of the computer may lead to artifacts on the screen. One example would be relatively abrupt changes in the pointer direction.

BRIEF SUMMARY

One embodiment remedies the disadvantages mentioned above. It proposes providing a CPI parameter that varies with the speed of the capture device.

One embodiment is a motion capture device designed to communicate with a host device in order to input data on the captured motion, comprising weighting means for weighting the displacement measurements with a gain, and adjusting means to adjust the gain as a function of at least one speed of the capture device.

In this manner one may decrease the gain when the capture device, for example a mouse, captures a relatively rapid motion. This avoids the problems related to overflow during transmission to the host device.

When the capture device captures a relatively slow motion, the gain may be relatively high. The captured motion, represented for example by the apparent displacement of a pointer on a screen of the host device, is thus relatively high. For a screen comprising a relatively high number of pixels, this avoids a decrease in the apparent displacement of the pointer on the screen for a given displacement of the mouse. In addition, the precision remains relatively high. The loss of precision due to a quantification of the motion as a number of counts is relatively low. And the factor applied by the host device may be relatively low, avoiding minimum displacements on the screen that exceed one pixel. In other words, each pixel on the screen may be reached by the pointer.

Advantageously, the adjusting means are arranged to modify the gain as a function of at least one previously acquired displacement measurement.

If the measurements are acquired at regular intervals, the speed of the capture device and the measurement(s) are approximately proportional. Of course, other indicators of the speed may be used to adjust the gain of the capture device.

Advantageously, the adjusting means are arranged to modify the gain as a function of the sum of multiple previously acquired displacement measurements. This corresponds to low-pass filtering (or smoothing), which avoids variations in the gain due to excessive sensitivity.

Alternatively, the gain may be readjusted based on a single displacement measurement.

Advantageously, the capture device comprises an accumulator connected to the weighting means, where the accumulator receives weighted displacement measurements and stores an accumulated displacement measurement. A communication means are provided, comprising a transmission buffer designed to receive an accumulated displacement measurement read from the accumulator. The communication means are designed to communicate to the host device the value received in the transmission buffer.

Conventional mouse capture devices commonly integrate the accumulator and such a means of communication. For example, one may obtain mice according to the first embodiment of the invention relatively easily, for example by modifying a computer program executed by a mouse processor.

Conventionally, the value read from the accumulator and received in the transmission buffer is truncated, and this truncated value is subtracted from the value stored in the accumulator. Because the weighting means are located upstream from the accumulator, a relatively high resolution may be maintained because the weighting is applied to the untruncated values.

The present invention is, of course, not limited by any of these characteristics, meaning the accumulator, the transmission buffer, or the means of communication. For example, the weighted measurements may be communicated one by one to the host device, without prior accumulation in an accumulator.

Advantageously, the adjusting means are connected to the transmission buffer, in order to modify the gain as a function of at least one measurement read from the accumulator. In this manner the gain is readjusted at each transmission to the host device, while multiple displacement measurements are acquired between two transmissions.

Alternatively, the means of adjustment may be without a direct connection to the transmission buffer. One may, for example, have the means of adjustment itself read from the accumulator at regular intervals, independently of the read from the accumulator done for the transmission to the host device.

The invention is not limited by the implementation of the communication with the host device: for example a PS2 port, a USB port, or wireless means of communication (radio link, Bluetooth, infrared, etc.) may be used. In the case of a mouse, it may of course be wired or wireless.

The means of adjustment may take into account the nature of the communication means between the capture device and the host when calculating the value of the gain. Typically, the gain may be adjusted such that the data sent to the host are sufficiently small in size for the transmission to the host to occur without overflow.

In one embodiment, the capture device is an optical mouse in which case the displacements measured are those of the mouse itself relative to a support such as a table or mouse pad, and the speed of the capture device is the speed of the mouse relative to this support. The mouse may also be a 3D mouse.

In another embodiment, the capture device is a mouse that may comprise a trackball, in which case the displacements measured are those of the ball, and the speed of the capture device is the speed of the ball. The mouse may also be a conventional optical mouse, Alternatively, the capture device may be (or may be comprised within) a touchpad device or a trackpoint device, in which case the displacements measured are those of the user's finger across the touchpad or trackpoint. The speed of the capture device is then the speed of the touchpad (or trackpoint) relative to the finger, which is the same as speed of the finger relative to the touchpad (or trackpoint).

Alternatively, the capture device may be (or may be comprised within) a graphics tablet, in which case the displacements measured are those of a tool, for example a stylus, across a surface of the tablet. Here again, the speed of the capture device is equal to the speed of the tool across the surface of the tablet.

Therefore the invention is in no way limited by the nature of the capture device. The capture device may also be (or may be comprised within) a joystick.

One embodiment is a motion capture system comprising the capture device according to the first aspect of the invention and a host device which is able to communicate with the capture device. The capture system may, for example, comprise an optical mouse and a computer's central processing unit.

Another embodiment is a method to be implemented by a motion capture device which communicates with a host device in order to input the captured motion. Said method comprises modifying a gain as a function of at least one speed of the capture device, and using this gain to weight a displacement measurement of the capture device.

Of course, the modifications to the gain and the weighting may be done at different frequencies. For example, the gain may be readjusted after one hundred weightings.

Another embodiment is a computer readable medium having contents that cause a motion capture device to perform a method that includes:
  receiving data from a sensor of the capture device,
  determining a displacement measurement of the capture device from data received from the sensor,
  weighting said displacement measurement by a gain, and
  modifying the gain as a function of a speed of the capture device.

BRIEF DESCRIPTION OF THE SEVERAL VIEWS OF THE DRAWINGS

Other features and advantages of the invention will become clear in the description of the embodiments which follows.

FIGS. 2, 3 and 4 correspond to the same embodiment and will be described at the same time.

DETAILED DESCRIPTION

Figure 1:
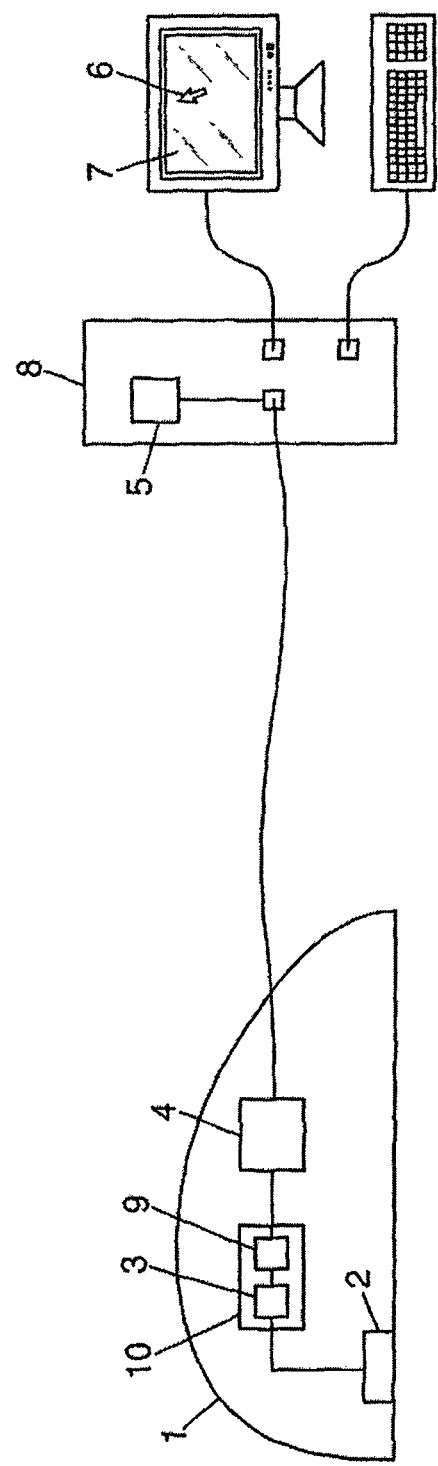
FIG. 1, already described, shows an example of a known capture system from the prior art.
Figure 2:
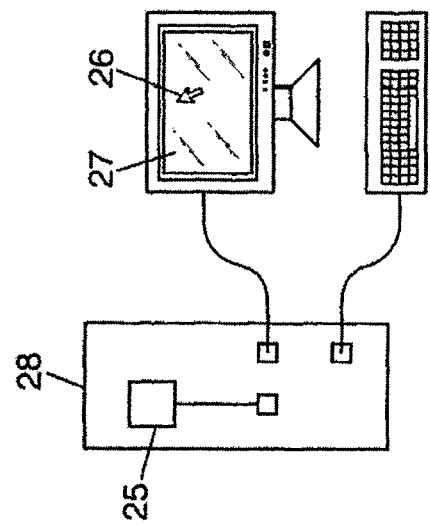
FIG. 2 shows an example of a capture system according to one embodiment of the invention.
Figure 2:
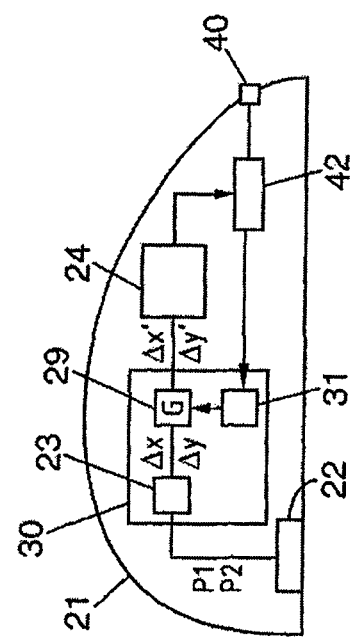

The capture system represented in FIG. 2 comprises a capture device and a host device, which in this embodiment are respectively an optical mouse 21 and a central processing unit 28 of a computer.

The mouse 21 comprises an optical sensor and a lens, labeled as number 22. The sensor captures image data P1, P2 and sends these image data to displacement determination means 23. The image data P1, P2 typically correspond to images captured at given instants. The determination means receive the image data (step 32 in FIG. 3). By comparing the image data P1, P2 captured between two instants, the determination means 23 determines a displacement measurement ($\Delta x, \Delta y$) in two dimensions x, y, corresponding to an interval of time between these two instants (step 33 in FIG. 3).

Each displacement measurement ($\Delta x, \Delta y$) is counted as counts, with each count corresponding to a 32nd of a point.

For example, for a sensor associating a point with a distance of 30 μm, and for a lens with a gain of 2, an actual displacement of 25.4 mm (one inch) in direction x or y corresponds to the integer of $$\frac{25.4}{2*30*10^{-3}}*32,$$

which is 13546 counts.

Figure 3:
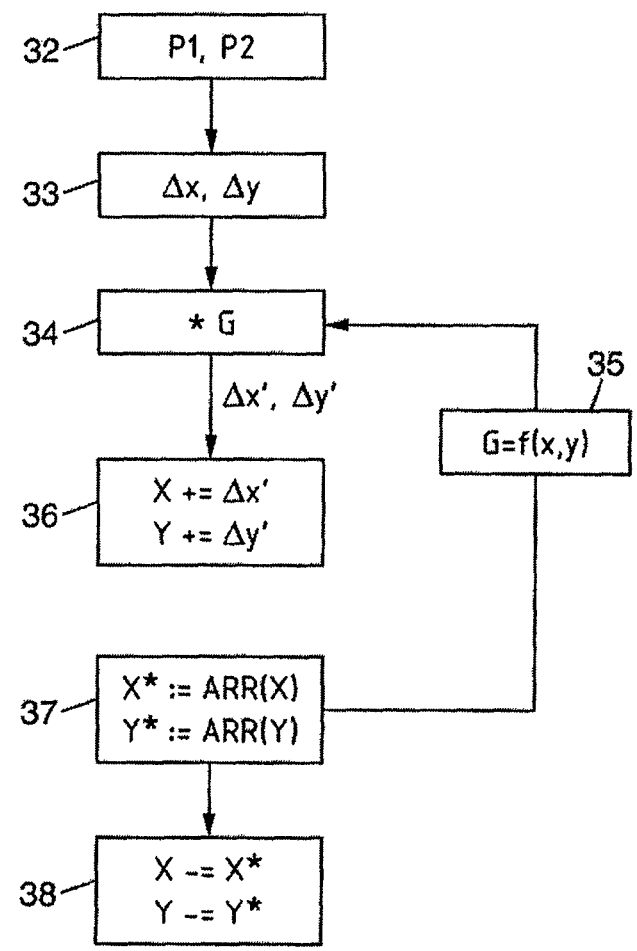
FIG. 3 is a flowchart showing an example of a process according to the embodiment in FIG. 2.

Weighting means 29 weight the displacement measurements by a gain G (step 34 in FIG. 3). The gain G is equal to a gain motion_scaling divided by 256 via shifts in the register where the displacement measurement is temporarily stored ($\Delta x, \Delta y$).

The gain motion_scaling may be modified by the means for adjusting the gain 31, as a function of the mouse speed.

The means 23, 29, 31 may be integrated into the same processing means, for example a processor 30.

The processor 30 is connected to an accumulator 24. Each weighted displacement measurement ($\Delta x', \alpha y'$) is sent to the accumulator 24 and added (step 36 in FIG. 3) to an accumulated displacement measurement (X, Y) in two dimensions x, y.

The accumulator 24 is designed to allow storing relatively high values for each dimension x, y, of the accumulated displacement measurement (X, Y), in order to avoid problems related to a possible overflow.

For each dimension x, y, the stored values are read and truncated (step 37 in FIG. 3), then received in a transmission buffer 42 for transmission to a buffer of a processor 25 of the central processing unit 28. Communication means including the buffer 42 are provided for this purpose.

In the case of a wireless mouse, a wireless communication protocol may be provided for transmitting the number of counts accumulated in the processor 25. In addition to the buffer 42, the communication means may, among other components, comprise a wireless transmitter/receiver 40.

In the case of a USB bus operating according to the HID specification, not represented in FIG. 2, communication means may, among other components, comprise a wire between the mouse and the central unit.

After each read, and for each direction, the truncated value is deducted from the value saved in the accumulator 24 (step 38 in FIG. 3). Alternatively, the accumulator 24 may be reset to zero.

The accumulator 24 continues to receive weighted values for the number of counts between two reads.

In addition, for each direction x, y, the value received in the buffer 42 is sent to the gain adjusting means 31. The gain adjusting means 31 in fact determine (step 35 in FIG. 3) the value of the gain motion_scaling, and therefore the gain G, from the accumulated displacement measurement (X, Y) read from the accumulator 24 during the read step.

In fact, the accumulated displacement measurement (X, Y) corresponds to the displacement captured between two reads from the accumulator. If the reads from the accumulator take place at regular intervals, the accumulated displacement measurement (X, Y) is representative of the mouse speed. From the values in the directions x, y of the accumulated measurement (X,Y), and from the current value of the gain motion_ scaling, the processor 30 may easily determine a value approximately proportional to the mouse speed.

Figure 4:
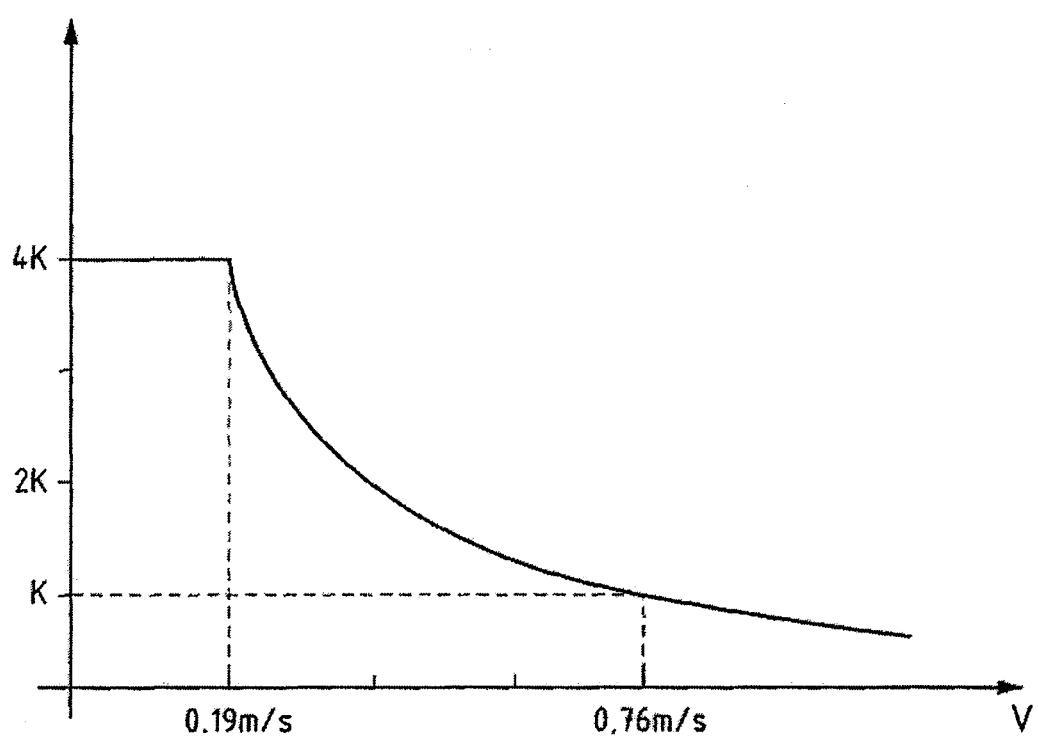
FIG. 4 is a graph representing an example of a variation in the gain as a function of the capture device speed, according to the embodiment in FIG. 2.

FIG. 4 is a graph representing an example of variations in the motion_scaling as a function of the mouse speed.

In this example, the motion_scaling is expressed as multiples of a value K equal to 8.

While the speed of the mouse is less than 0.19 m/s, the motion_scaling is equal to 32, which is a gain G of 0.125 after considering the shifts in the shift register. An actual displacement of 25.4 millimeters (one inch) in one of the directions x, y thus corresponds to 1693 counts, which is a CPI parameter of 1693 counts per inch. For simplicity, this is called a CPI parameter of 1600 counts per inch.

The gain motion_scaling decreases beyond the limit of 0.19 m/s.

In fact, the wireless transmission protocol used in the illustrated embodiment allows, for each displacement direction x or y, the transmission of 8 signed bits of data every 10 milliseconds, which is 12700 counts (positive or negative) per second. For a CPI value of 1600 CPI, this limit corresponds to a maximum mouse speed in one of the directions x, y of $$\frac{12700}{1693} * 25.4 * 10^{-3}$$

meters per second, which is approximately 0.19 m/s.

The decrease in the gain motion_scaling for speeds exceeding 0.19 m/s allows avoiding overrun problems when transmitting the accumulated value to the central processing unit. The means for adjusting the gain 31 in FIG. 2 thus take into account the bandwidth of the channel used to transmit the value stored in the accumulator to the host device.

For a mouse speed of 0.76 m/s, the gain motion_scaling drops to 8, which is a CPI value of 423 CPI. In fact, in light of the report rate specified in the HID specifications, the maximum mouse speed for a CPI value of 423 CPI is $$\frac{12700}{423} * 25.4 * 10^{-3}$$

meters per second, or approximately 0.76 m/s.

In this example, the value of the motion_scaling varies with the speed by 1/x when the mouse speed is greater than 0.19 m/s. The means for adjusting the gain are therefore designed so that above 0.19 m/s, it uses approximately the maximum bandwidth of the channel for transmitting the value stored in the accumulator to the host device.

Of course, the invention is not limited to such a curve. In particular, one may systematically underutilize the bandwidth of this channel. It is the previous accumulated measurement which serves as the basis for the gain calculation: providing a safety margin avoids an overrun in the channel if the mouse speed increases. The safety margin may for example be fixed, meaning the curve representing the variations in the motion_scaling as a function of the speed has the same appearance as the curve in FIG. 4, but with the values for the motion_scaling shifted by an identical value.

There may also be linear variations with the speed, or stepwise variations. Depending on the desired application, there may also be a gain motion_scaling for low speeds which is higher or lower than 4*K, a speed limit beyond which the gain motion_scaling decreases differently, etc.

If, for example, the values X, Y read from the accumulator are equal to +42 and −103 counts respectively, for a current motion_scaling of 16, the processor 30 in FIG. 2 may calculate a mouse speed, or at least a value approximately proportional to the mouse speed. The corresponding displacement of the mouse is approximately equal to $$\sqrt{(42^2 + 103^2)} * \frac{256}{16} * \frac{1}{32} * 2 * 30 * 10^{-6},$$

which is approximately 3.34 millimeters. If the values X, Y are read at a report rate of 10 milliseconds, this displacement corresponds to a speed of 0.334 m/s. The gain motion_scaling may then be readjusted using this new value for the speed. If one refers to the curve in FIG. 4, the gain motion_scaling assumes a value of about 18.2.

Thus in 10 milliseconds, the gain motion_scaling increases from a value of 16 to a value of about 18. In order to avoid such variations in gain, one may use an average of the speeds over a longer period, on the order of a tenth of a second for example, or a sum of the displacement measurements accumulated over several read cycles.

In an alternative embodiment not represented in the figures, one may instead readjust the gain at a much higher readjustment frequency, for example, at each acquisition of a displacement measurement (Δx,Δy).

To return to FIG. 2, the measurement transmitted from the mouse to the central processing unit is received in the processor 25, inputting the motion captured by the mouse. A driver run by the processor 25 may be used to amplify by a given factor each value for the number of accumulated counts received. The driver also allows moving a pointer 26 on a screen 27 by a number of pixels approximately proportional to the amplified value. The motions of the pointer 26 on the screen are thus approximately proportional to the motion captured by the sensor 22.

In this embodiment, beyond 0.19 m/s, the gain for the mouse is approximately as high as possible for the bandwidth of the channel between the mouse and the central processing unit. The loss in precision resulting from the quantification into the number of counts is therefore relatively low. In addition, the factor applied by the driver may be relatively low, such that the pointer 26 moves in a relatively precise manner.

It will be appreciated that the various means discussed above could be implemented with hardware, code (software or firmware), or a combination of hardware and code.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A motion capture device, comprising:
a weighting module configured to receive a displacement measurement and a gain, the weighting module configured to generate a weighted displacement measurement from the displacement measurement and the gain;

a transmitter configured to transmit the weighted displacement measurement to a host device to input captured motion via a transmission channel between the transmitter and the host device; and a gain adjusting module configured to generate the gain as a function of a speed by which the capture device is displaced, a previously generated weighted displacement measurement, and a communication bandwidth of the transmission channel.

2. The capture device according to claim 1 wherein:
the gain adjusting module is configured to modify the gain as a function of a sum of a number of previously acquired weighted displacement measurements.

3. The capture device according to claim 2, further comprising:
an accumulator coupled to the weighting module and configured to receive consecutive weighted displacement measurements and to store an accumulated displacement measurement of the weighted displacement measurements; and
a transmission buffer coupled between the accumulator and the transmitter and configured to receive the accumulated displacement measurement from the accumulator;
the transmitter being configured to communicate to the host device the accumulated displacement measurement received in the transmission buffer.

4. The capture device according to claim 3 wherein:
the gain adjusting module is coupled to the transmission buffer and is structured to modify the gain as a function of the accumulated displacement measurement.

5. The capture device according to claim 1, further comprising:
a measuring module configured to measure a displacement of the capture device, where said measuring module is coupled to the weighting module and is configured to supply the displacement measurement to the weighting module.

6. The capture device according to claim 1, wherein the measuring module includes:
an optical sensor configured to capture image data; and
a determining module configured to determine the displacement measurement from the captured image data.

7. The capture device according to claim 1 wherein the capture device is an optical mouse having an optical sensor coupled to the weighting module.

8. A capture system, comprising:
a host device; and
a capture device in communication with the host device, the capture device including:
an amplifier structured to generate a weighted displacement measurement from a displacement measurement and a gain;
a transmitter configured to transmit the weighted displacement measurement to the host device via a transmission channel between the transmitter and the host device; and
an adjustment module structured to adjust the gain as a function of a speed of displacement of the capture device, a previously generated weighted displacement measurement, and a communication bandwidth of the transmission channel between the transmitter and the host device.

9. The capture system according to claim 8 wherein the adjustment module is structured to modify the gain as a function of a previously acquired weighted displacement measurement.

10. The capture system according to claim 9 wherein the adjustment module is structured to modify the gain as a function of a sum of a number of previously acquired weighted displacement measurements.

11. The capture system according to claim 8, further comprising:
an accumulator coupled to the amplifier, the accumulator being configured to receive consecutive weighted displacement measurements and to store an accumulated displacement measurement; and
a transmission buffer coupled between the accumulator and the transmitter and configured to receive the accumulated displacement measurement from the accumulator, wherein the transmitter is configured to communicate to the host device the accumulated displacement measurement received in the transmission buffer.

12. The capture system according to claim 11 wherein:
the adjustment module is coupled to the transmission buffer and is structured to modify the gain as a function of the accumulated displacement measurement from the accumulator.

13. The capture system according to claim 8, further comprising:
a sensor structured to acquire the displacement measurement of the capture device, the sensor being coupled to the amplifier and configured to supply the displacement measurement to the amplifier.

14. The capture system according to claim 13, wherein the amplifier includes a software module executed by a processor.

15. A method, comprising:
modifying a gain as a function of a speed of displacement of a capture device;
generating a weighted displacement measurement by weighting with the gain a previously generated weighted displacement measurement of the capture device, wherein modifying the gain includes taking into account a communication bandwidth of a transmission channel between a transmitter and a host device; and
transmitting the weighted displacement measurement to the host device via the transmission channel between the transmitter and the host device.

16. The method according to claim 15 wherein the modifying and weighting are performed by the capture device.

17. The method according to claim 15, further comprising:
determining an accumulated displacement measurement based on consecutive weighted displacement measurements; and
communicating to the host device the accumulated displacement measurement.

18. A non-transitory computer readable medium having contents that cause a motion capture device to perform a method that includes:
receiving data from a sensor of the capture device;
determining a displacement measurement of the capture device from the data received from the sensor;
generating a weighted displacement measurement by weighting said displacement measurement by a gain;
modifying the gain as a function of a speed of displacement of the capture device, a previously generated weighted displacement measurement, and a communication bandwidth of a transmission channel between a transmitter and a host device; and
transmitting the weighted displacement measurement to the host device via the transmission channel between the transmitter and the host device.

* * * * *